United States Patent
Mills et al.

(10) Patent No.: US 7,017,730 B2
(45) Date of Patent: Mar. 28, 2006

(54) BI-DIRECTIONAL MAIL TRAY PUSHER

(75) Inventors: Shane F. Mills, Owego, NY (US); Thomas A. Arnold, Owego, NY (US); Michael E. Caporali, Owego, NY (US); John Rasile, Owego, NY (US); Brian F. Sharkey, Los Angeles, CA (US)

(73) Assignee: Lockheed Martin Corporation, Bethesda, MA (US)

( * ) Notice: Subject to any disclaimer, the term of this patent is extended or adjusted under 35 U.S.C. 154(b) by 455 days.

(21) Appl. No.: 10/349,832

(22) Filed: Jan. 23, 2003

(65) Prior Publication Data

US 2005/0072652 A1    Apr. 7, 2005

Related U.S. Application Data

(63) Continuation-in-part of application No. 09/853,122, filed on May 10, 2001.

(60) Provisional application No. 60/203,593, filed on May 12, 2000.

(51) Int. Cl.
*B65G 47/46* (2006.01)

(52) U.S. Cl. ............ 198/368; 198/890; 198/351; 198/370.08

(58) Field of Classification Search ............ 198/349.1, 198/349.2, 349.4, 349.5, 350, 351, 890, 368, 198/370.02, 370.08
See application file for complete search history.

(56) References Cited

U.S. PATENT DOCUMENTS

| | | | |
|---|---|---|---|
| 1,905,379 A | 4/1933 | Gotthardt et al. | 198/401 |
| 1,934,377 A * | 11/1933 | Robbins | 198/352 |
| 1,939,891 A | 12/1933 | Glahn et al. | 198/38 |
| 2,732,057 A | 1/1956 | Temple | 198/85 |
| 3,782,527 A | 1/1974 | Petershack | 198/25 |
| 3,803,556 A | 4/1974 | Duffy | 340/172.5 |
| 3,828,928 A | 8/1974 | Roderick, Jr. | 209/74 R |
| 3,927,755 A | 12/1975 | Ritola | 198/25 |
| 4,244,672 A * | 1/1981 | Lund | 198/350 |
| 4,821,865 A | 4/1989 | Hirata et al. | 198/368 |
| 5,048,665 A * | 9/1991 | Vickers | 198/350 |

(Continued)

*Primary Examiner*—James R. Bidwell
(74) *Attorney, Agent, or Firm*—Perkins Smith & Cohen LLP; Jacob N. Erlich; Harvey Kaye (57) ABSTRACT

A bidirectional article pusher for a conveying system, which includes a multiplicity of spaced rollers for moving articles along a longitudinal path. There is a push up stop arranged below the conveyor and movable between adjacent rollers to a position above the rollers to stop forward movement of an article which is on the rollers. There are lateral stations, one on each side of a section of the conveying system, and lateral diverters move articles which are on the rollers and stopped by the push up stop, to a position off of the rollers and out of the longitudinal path and at a right angle to the longitudinal path. A stop activator is controlled based upon information, such as that on a bar code sort label on an article and which has been previously provided to the control device upstream of the push up stop. There are three jam detection/correction devices provided to assure proper operation. One is a proximity sensor to detect the presence of the pusher fingers while in their home position. The other is a current overload sensor circuit which detects jams. The third is a number of software timers embedded in the control software for controlling the diverter arrangement. There is also an acceleration profiler which obtains weight information and uses it to control acceleration/deceleration of the articles being moved.

20 Claims, 6 Drawing Sheets

U.S. PATENT DOCUMENTS

| | | | |
|---|---|---|---|
| 5,396,980 A * | 3/1995 | Sobrero | 198/370.02 |
| 5,609,236 A | 3/1997 | Neukam | 198/370.1 |
| 5,655,643 A | 8/1997 | Bonnet | 198/370.08 |
| 5,706,928 A | 1/1998 | Neukam | 198/349 |
| 5,971,132 A | 10/1999 | Bonnet | 198/370.07 |
| 6,230,872 B1 * | 5/2001 | Huang et al. | 198/368 |
| 6,264,042 B1 * | 7/2001 | Cossey et al. | 198/890 |
| 6,359,247 B1 | 3/2002 | Lem et al. | 209/564 |

* cited by examiner

FIG. 9 Communication Architecture

FIG. 11

| Acceleration Lookup Table | | | | |
|---|---|---|---|---|
| Tier | Measured Weight | Acceleration | Deceleration | Acceleration Profile Description |
| 1 | 0 – 5 lbs. | 0.5 in/sec$^2$ | 0.5 in/sec$^2$ | Very light articles, slow gradual acceleration and deceleration profiles |
| 2 | 5 – 20 lbs. | 1.0 in/sec$^2$ | 1.0 in/sec$^2$ | Light to medium weight trays, low-intermediate acceleration and deceleration profiles |
| 3 | 20 – 40 lbs. | 1.5 in/sec$^2$ | 1.5 in/sec$^2$ | Medium to heavy weight trays, high-intermediate acceleration and deceleration profiles |
| 4 | 40 – 75 lbs. | 2.0 in/sec$^2$ | 2.0 in/sec$^2$ | Very heavy weight trays, fastest acceleration and deceleration profiles |

FIG. 10 Acceleration Profiles

BI-DIRECTIONAL MAIL TRAY PUSHER

CROSS-REFERENCE TO RELATED APPLICATIONS

The present application is a continuation-in-part application of co-pending utility application Ser. No. 09/853,122 filed May 10, 2001, which is based upon and claims the benefit of provisional application Ser. No. 60/203,593 filed May 12, 2000.

FIELD OF THE INVENTION

The present invention relates generally to the sorting and conveying art, and, more particularly, to a bi-directional article pusher which may move the articles to either lateral side of a conveyor depending upon control information.

BACKGROUND OF THE INVENTION

In certain types of sorting and conveying systems, such as mail tray sorting systems, articles need to be diverted at right angles in two directions on either side of a conveyor in a very dependable and repeatable way. Current bi-directional designs are expensive, not sufficiently fast and are prone to errors due to design. In addition, after continual use in the postal system, mail tray type articles have an infinite number of variations making them inaccurate and of non uniform dimensions. Such articles have a tendency to jam in conveyor lines for various reasons.

U.S. Pat. No. 1,905,379 describes a conveying system where, when mechanical trip arms are activated, an article on a main conveyor is diverted to a lateral conveyor which does not divert bi-directionally and does not have a robust control arrangement.

U.S. Pat. No. 1,939,891 describes a conveyor system in which articles are removed at work stations by being diverted laterally, and the particular location to which the article is delivered is determined by the location on the article of a pin which engages a circuit maker.

U.S. Pat. No. 2,732,057 describes a bakery conveyor system in which baking pans are passed through a baking operation and after baking, the pans are washed and dried for continuous circulation of the pans.

U.S. Pat. No. 3,782,527 describes a clipped disc device for right angle transfer, where clipped discs positioned in a main conveyor path are activated to move articles off a main conveyor to a lateral conveyor which does not divert bi-directionally and the control arrangement of which is not robust.

U.S. Pat. No. 3,803,556 describes a conveyor control system in which individual tote pans which are to be diverted at selected stations along a conveyor are uniquely identified by a binary address which directly identifies a memory core address location.

U.S. Pat. No. 3,828,928 describes a log sorting apparatus, where log kicker arms displace a log from a main conveyor to a lateral conveyor using a chain conveyor and the kicker arms.

U.S. Pat. No. 3,927,755 describes a sorting apparatus with a rotating article diverter where a main conveyor has cams that, when activated, divert travel of a lumber object from the main conveyor to a lateral receiver and has a lug conveyor.

U.S. Pat. No. 4,821,865 describes a work delivering apparatus having three exits paths.

U.S. Pat. No. 5,609,236 describes a roller conveyor device which includes transverse rollers.

U.S. Pat. No. 5,655,643 describes a high speed compound belted diverter where an article travels along a main conveyor then, using active sensors, the article is diverted off the main conveyor to a lateral conveyor discharge area and uses a swing-arm belt, and diverts articles lengthwise and does not divert bi-directionally.

U.S. Pat. No. 5,706,928 describes a picking system which includes a conveyor for carrying containers which are automatically labeled, and a device for removing the labels.

U.S. Pat. No. 5,971,132 describes a high speed automated cog sorter in which a conveyor includes diverter stations and laterally movable post carriers.

U.S. Pat. No. 6,359,247 describes a multi-fire and variable fire diverter conveyor system for transporting items and diverting the items to one of a plurality of stations.

SUMMARY OF THE INVENTION

The present invention provides multiple jam detection arrangements. Such jams occur for various reasons, such as that the articles, after long periods of use tend to change from their original dimensions.

There is a variable speed drive to accommodate different weight articles.

The invention may be used for diverting United States Postal Service (USPS) mail trays of various sizes from single file on a main conveyor onto buffer lateral conveyors, one on each side, for later pick up. This includes a tray entering the diverter zone, a sensor detecting the tray, a push up stop being activated and selective tray diverting accomplished by pushers to one of the lateral holding zones.

This system has at least three jam detection arrangements. In the first one, a proximity sensor in the form of a Hall Effect sensor is used to detect the presence of the diverting pushers in their home position. It senses the presence of any of the pusher fingers in the home position. In this position all of the pusher fingers are below conveyor level so that product of any type may pass by. For example, if one of "n" pusher fingers is not sensed within a time increment "x", there is a problem and the master control system is flagged and all system motion is stopped. The system master controller expects to see the finger in the home position at the end of an index move and if the finger is not sensed to be in the home position, this indicates there is a problem of some type.

In the second jam detection system a current overload sensor circuit is embedded in the DC motor's controller. Current overload sensing is a known feature in motor controller designs. Implementation or utilization of this feature is determined by the system integrators or end user. If there is a jam on the conveyor, such as when an article is caught between the pusher finger and the conveyor side wall, the whole pusher mechanism will stop moving because it is trying to push an immovable object. This action, in turn, forces a higher electical load than normal back to the motor and its controller, thus causing a current spike. The motor controller circuitry senses that situation and opens the circuit so that no motor or circuit damage occurs. At the same time the controller sends a signal to the master control system via an RS-232 connection, for example, which in turn flags the area to be cleared while stopping all system motion.

The third jam detection system is in a form including software timers which are embedded in the system software control code. After the system software invokes certain mechanical executables, internal timers are started while the software is waiting for hardware to perform its duties and send back an input signal indicating such action has occurred (successful completion of the mechanical step). The software is expecting a certain input to maintain correct continual operation status. If the software does not receive the correct input signal in the allotted time plus a delta (difference)(aka software timer), an error flag is raised to the master control system and the system stops all motion. The control cabinet provides physical networking connections between the control computer and the electromechanical hardware. The control cabinet features optical input/output boards that send and receive signals from hardware objects such as proximity sensors or photo sensors and process them for interpretation by the system computer where the system software resides.

These three jam detection arrangements, working in concert, provide an extremely reliable jam detection sub-system that covers all forms of jam faults.

When attempting to maneuver an article laterally, which is 90 degrees from an article's present longitudinal course, care should be taken with respect to the amount of force and hence acceleration (F=ma) that is used to move the at-rest article. The point of contact between the pusher fingers and the article is relatively lower than the article's center of gravity depending on how much mail is contained in each mail tray (infinitely variable between 0 and 75 lbs).

The sub-system for the bi-directional pusher dynamically changes the acceleration profile of the diverter motor based on article weight information gathered from a commercially available in-motion scale. The weight information is gathered upstream from a particular diverter location and is accurate to within +/−0.1 lbs. This information is sent via an RS-232 communication line, for example, to the master controller. The DC motor controller receives that information from the main control system and adjusts (re-programs) the acceleration and deceleration profiles such that the article does not tip, flip, stay where it is or fly off the conveyor. The movement of the pusher fingers is customized for the particular characteristics of the mail tray article. This control theory makes the operation much more controllable and reliable therefore promoting a more robust conveyor system.

This invention discloses a manner of diverting USPS mail trays, or other articles, of various sizes from a single file line on the main conveyor onto laterally located buffer conveyors for pick-up by a robot or human. These trays can be sleeved, banded, lidded or open. This lateral movement of the tray is 90 degrees to the left or to the right of the continuous flow line of trays being processed.

The apparatus is housed between the side frames of the main conveyor and provides the motion necessary to divert trays to the left or to the right. In one embodiment, there is a special attachment roller chain that, for example, three equally spaced pusher fingers attached to it mechanically. The chain rotates in a clockwise or counterclockwise direction ⅓ revolution (depending upon the number of pushers, which, in this example, is three) each cycle depending upon where the tray needs to be pushed. The pusher assembly is positioned in such a manner on a support bracket that it protrudes through the spaces in the conveyor where it is able to make contact with trays in order to force them to one side or the other. There may be four attachment roller chain assemblies, for example, that are spaced equally apart throughout the length of the pusher module.

In this embodiment, the attachment roller chain may articulate around two idler sprockets and one drive sprocket which is mechanically connected to a shaft. The shaft is driven via a sprocket and chain combination by a motor with an integral gear reducer. There may also be a controller that governs the motor's velocity profile in such manner that it accelerates an article slowly for the first part of the cycle until it reaches a plateau and then decelerates the article quickly at the very end of the cycle to provide time for the tray to exit the conveyor and proceed into the buffer zone. In one embodiment, the chain is guided and supported in one section of its travel by a type of plastic block that is machined so that it compliments the profile of the roller chain.

The roller chain is tensioned in another portion of its travel by the same type of plastic block that is machined to a half moon shape to compliment the chain's profile. A feature for moving the tray with this design is a positive pusher engagement that contacts the tray from the side and accelerates it out of the way. The pusher may have a bearing mounted on the end to aid in cycle time and prevents damage to the trays. In order to divert trays properly, the trays need to be stopped momentarily for diversion. This device also contains a mechanism which stops the trays in a pre-arranged repeatable location so they may be diverted by the pushers.

This push up stop is located on the output end of the bi-directional conveyor zone. The push up stop may be constructed of a formed sheet metal stop plate that pivots in an exact location with the aid of a pneumatic cylinder with a spring return. This diversion is accomplished with sensors and control logic.

Other objects, features and advantages will be apparent from the following detailed description of preferred embodiments taken in conjunction with the accompanying drawings in which:

DETAILED DESCRIPTION OF THE PREFERRED EMBODIMENTS

Figures 4, 7:
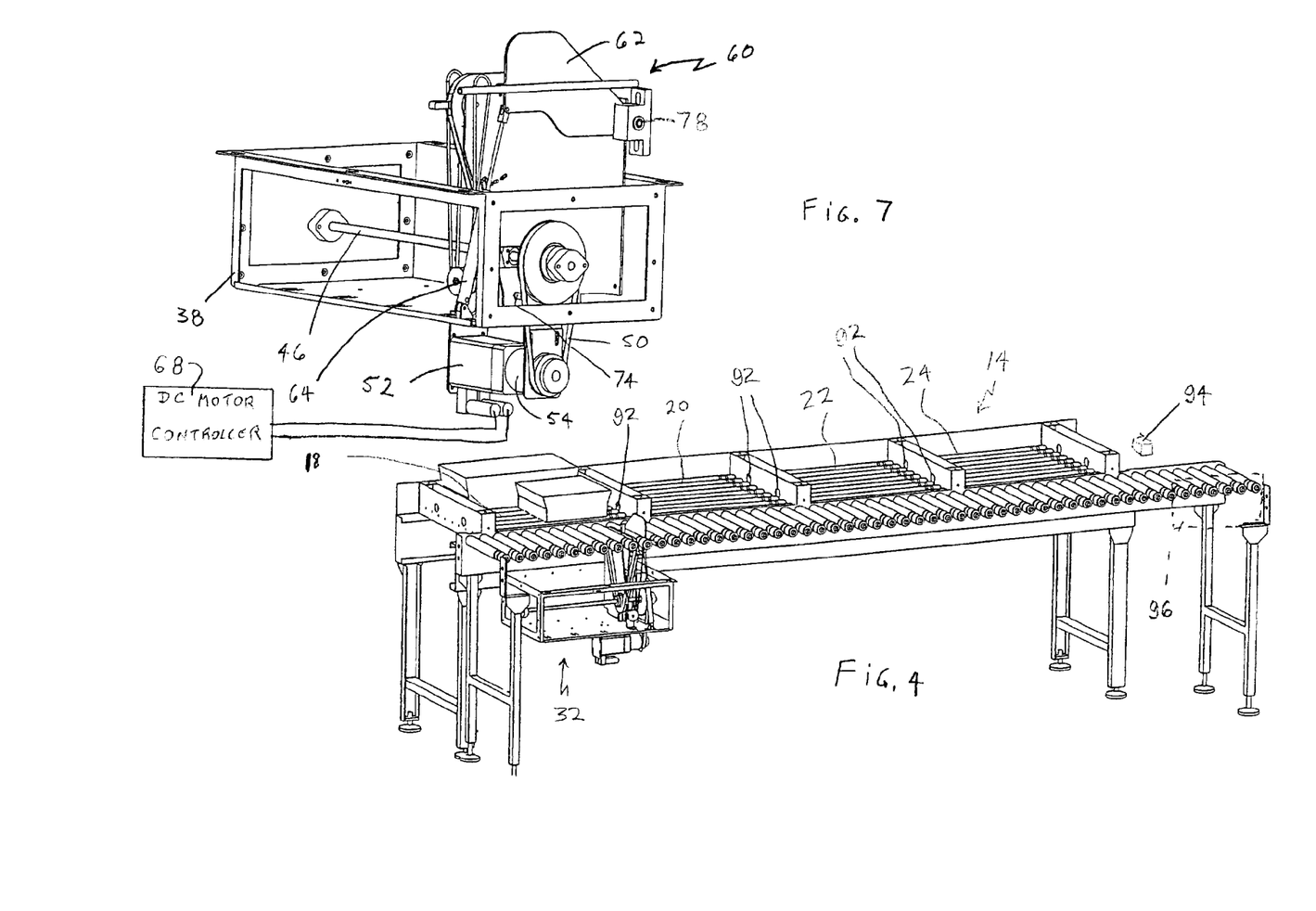
FIG. 4 is an isometric view of a full pusher section with one of the lateral delivery zones being removed.
FIG. 7 is an isometric view of the portion of a pusher mechanism shown in FIG. 6 and viewed from the opposite direction so the other side of the mechanism may be seen.
Figures 5, 6:
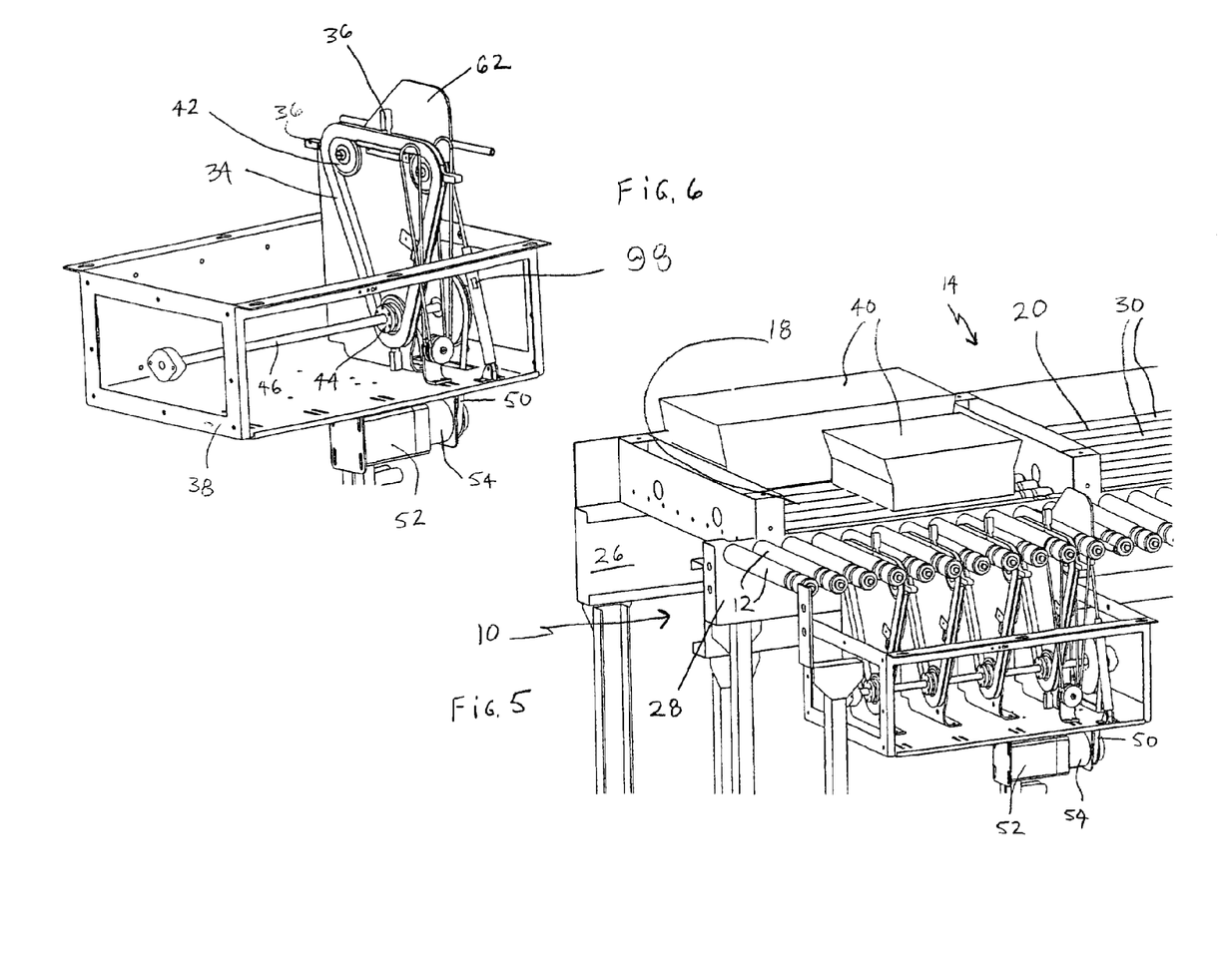
FIG. 5 is an isometric view of a pusher mechanism.
FIG. 6 is an isometric view of one portion of a pusher mechanism.
Figure 8:
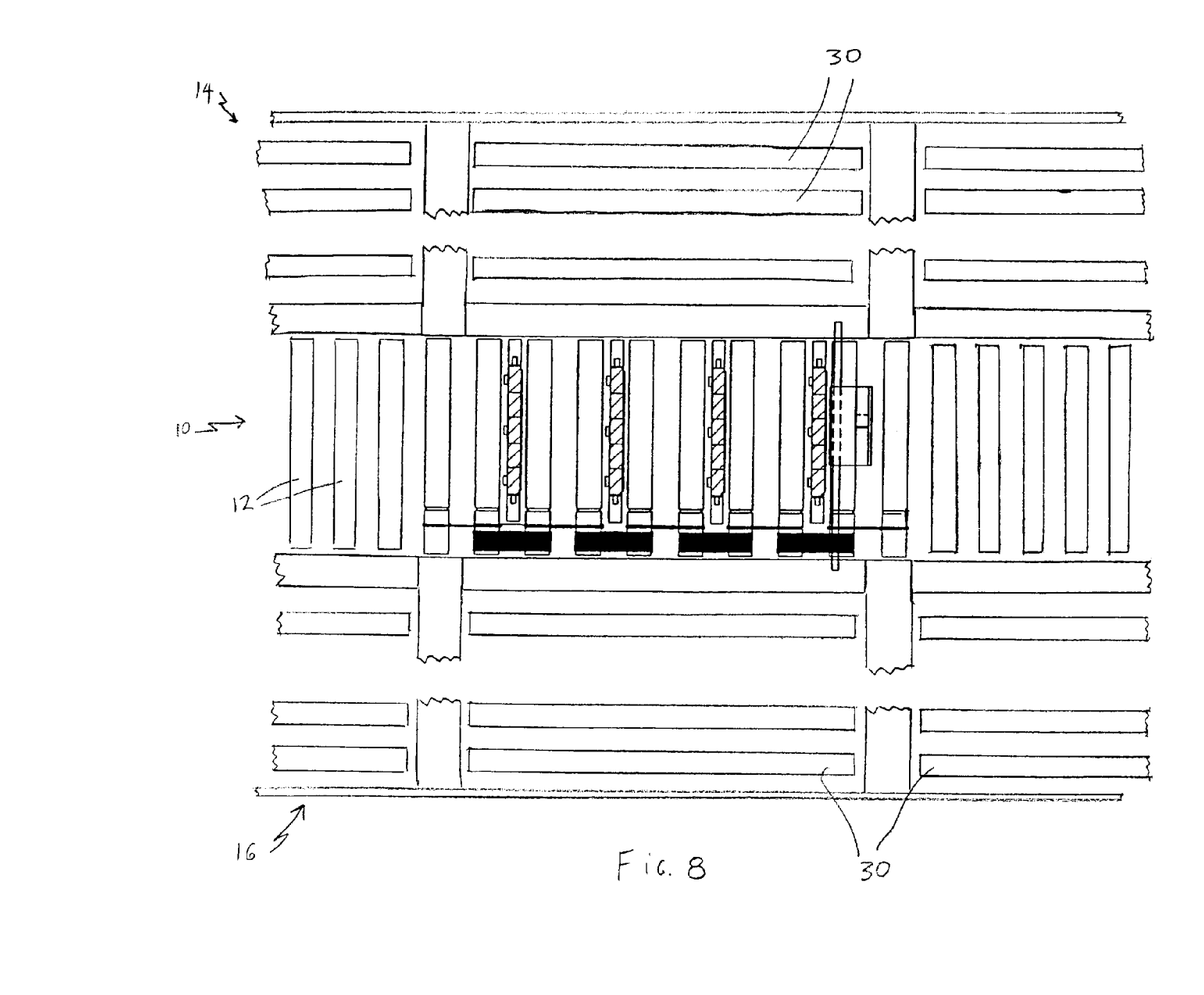
FIG. 8 is a plan view similar to FIG. 1 and showing portions of both lateral compartment rows.

As shown in FIGS. 4, 5 and 8, main conveyor 10 extends in a longitudinal path and includes rollers 12 over which the articles, in this case mail trays, move. The conveyor is arranged in zones which are free of one another and each of which is separately driven from the others. For example, there can be a single drive roller in each zone which drives nine other rollers, five upstream from the drive roller and four downstream of the drive roller. Each zone can, for example, be thirty inches in length. As shown in FIG. 8 (on the right side of the figure) each roller 12 has two grooves 80 and 82 so that one groove on each roller is used to drive or be driven by one adjacent roller by a belt 84 and the other groove is used for the same purpose for the adjacent roller on the other side and using a different belt 86.

There are a series of lateral compartments extending longitudinally on both sides of the conveyor 10 and parallel to the conveyor and forming zones designated 14 and 16. The lateral compartment series 14 on one side is shown having compartments 18, 20, 22 and 24 and each has a series of rollers 30 which are at right angles to the rollers of the main conveyor 10. This can be best viewed in FIG. 4.

Figure 1:
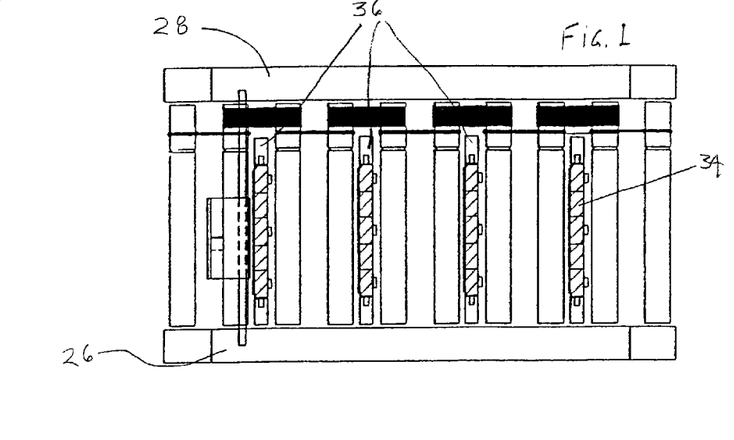
FIG. 1 is a schematic plan view of one simplified bidirectional pusher section of a conveyor system.
Figure 2:
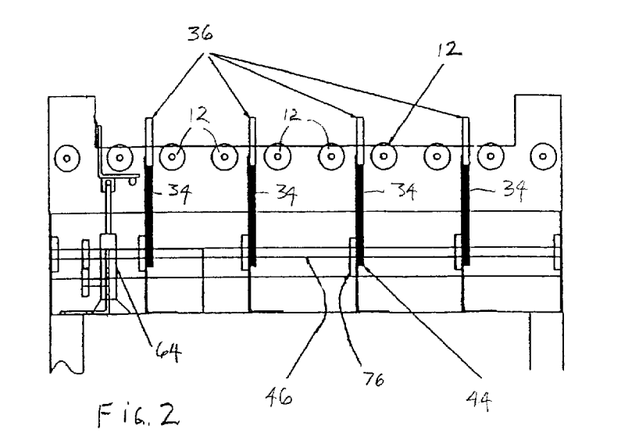
FIG. 2 is a schematic side view of the simplified bidirectional pusher section of FIG. 1.
Figure 3:
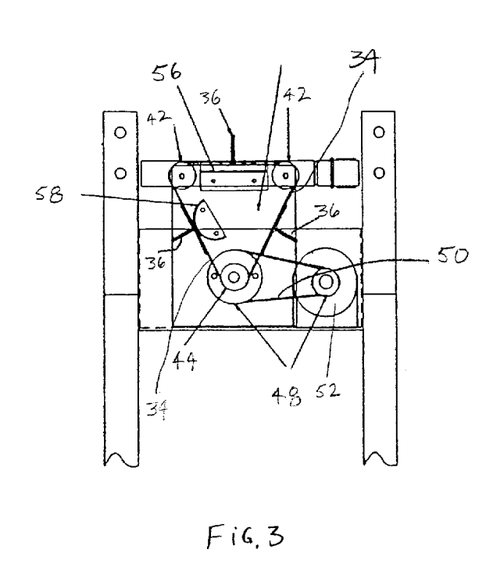
FIG. 3 is a schematic end view of a pusher section of the simplified bi-directional pusher section of FIGS. 1 and 2.

FIG. 1 is a plan view of the first portion of the main conveyor 10 where the trays can be moved bi-directionally laterally and the main conveyor rollers 12 can be seen supported in side rails 26 and 28. Portions of the lateral compartment series 14 and 16 can be seen on the sides. FIG. 8 shows the rows of compartments 14 and 16 on both sides of the main conveyor 10. In a typical arrangement there are four such compartments on each side.

As shown in FIG. 4, in which the row of compartments 16 has been omitted for clarity, the relationship of one of the tray lateral movers 32 is shown. In a typical arrangement there are four such movers. The details of the lateral movers are best seen in FIGS. 5–7.

This lateral moving apparatus 32 is housed between the side frames of the main conveyor and provides the motion necessary to divert trays to the left or to the right. There is a special attachment roller chain 34, that has, for example, three equally spaced pushers 36 attached to it mechanically, and which rotates in a clockwise or counterclockwise direction ⅓ of a revolution each cycle, depending upon where the tray needs to go. The pusher assembly 32 is positioned in such a way on a support bracket 38 that it protrudes through the spaces in the conveyor, between the rollers 12, where it is able to make contact with trays 40 in order to force them to one side or the other. There are four attachment roller chain assemblies that are spaced equally apart throughout the length of the pusher module. The attachment roller chain 34 articulates around two idler sprockets 42 and one drive sprocket 44 which is mechanically connected to a shaft 46. The shaft 46 is driven via a sprocket 48 and chain 50 combination by a motor 52 with an integral gear reducer 54. The drive shaft 46 is mounted in bearings 76.

There is also a controller 66 that governs the motor's velocity profile in such a way that it accelerates slowly for the first part of the cycle until it reaches a plateau and then decelerates quickly at the very end of the cycle to give time for the tray 40 to exit the conveyor 12 and go into one of the buffer zones 14 and 16.

The chain 34 is guided and supported in one section of its travel by a plastic block or chain guide 56 that is machined in such a way that it compliments the profile of the roller chain. The roller chain 34 is tensioned in another portion of its travel by a particular type of plastic block that is machined in such a way that it compliments the profile of the roller chain. The roller chain 34 is tensioned in another portion of its travel by the same type of plastic block 58 that is machined to a half moon shape to compliment the chain's profile. To move the tray 40 there is a positive pusher engagement that contacts the tray 40 from the side and accelerates it out of the way. The pusher 36 has a bearing (not shown) mounted on the end to aid in cycle time and prevents damage to the trays.

In order to divert trays 40 properly, the trays 40 need to be stopped momentarily for diversion. This device also contains a mechanism which stops the trays in a known repeatable location so that they may be diverted by the pushers 36. This push up stop 60 is located on the output end of the bi-directional conveyor zone. The push up stop 60 may include a formed sheet metal stop plate 62 that pivots in an exact location with the aid of a pneumatic cylinder 64 with a spring return. There is a pivot 78 for the plate of the push-up stop.

In the sections where there are lateral movers 32, the belt arrangements for driving the belts of a zone need to be modified from the drive arrangements in the other conveyor zones. The reason is that the pushers 36 on the roller chains 34 extend between adjacent rollers 12 and need to travel sufficiently laterally as to deliver articles into the lateral zones. Therefore, these rollers cannot have the belts 84 and 86 to drive them. Instead, there are belts 88 between rollers which extend downwardly to an idler pulley 90.

This diversion is accomplished with sensors and control logic. There is one infrared or other type of input sensor 94 located on the input end of the conveyor zone where it is housed inside the side frame rails for concealment and protection. Its function is to communicate to the master processor or controller 66 that there is an incoming tray present. There are infrared or photo-electric sensors 92 located on each side of the bi-directional conveyor, at the lateral outputs into the buffer zone, which communicate to the master processor 66 that the tray 40 has in fact been diverted properly and is clear. There is a proximity sensor 74 located within the pusher assembly which indicates when the push attachment is present. The proximity sensor 74 senses when a pusher 36 is located in a position extending directly downwardly as one of the pushers 36 is shown in FIG. 6. This is the "home" position whenever one of the pushers 36 is located in this position. The cycle will stop when the next pusher is sensed after a sufficient rotation that the next pusher 36 is in the home position. The control logic for this device is adaptable to different configurations.

This system has at least three jam detection arrangements. In the first the proximity sensor 74, which may be in the form of a Hall Effect sensor, is used to detect the presence of the diverting pushers 36 in their home position. It senses the presence of any of the pusher fingers 36 in the home position. In this position all of the pusher fingers 36 are below the conveyor level such that products of any type may pass by. For example, if one of "n" pusher fingers is not sensed within a time increment "x", there is a problem and the master control system is flagged and all system motion is stopped. The system master controller 66 expects to be notified that the finger 36 is in the home position at the end of an index move.

In the second jam detection system, a current overload sensor circuit is embedded in the DC motor's controller 68. Current overload sensing is a commercially available feature in many motor controller designs. Implementation and/or utilization of this feature may be determined by the system integrators or end user. If there is a jam on the conveyor, such as when an article is caught between the pusher finger 36 and a conveyor sidewall 26 or 28, the entire pusher mechanism will stop moving because it is attempting to push an immovable object. This action, in turn, forces a higher load than normal back to the motor 52 and the motor controller 68, thus causing a current spike. The motor controller circuitry senses that situation and opens the circuit so that no motor or circuit damage occurs. At the same time the motor controller 68 may send a signal to the master control system 66 via an RS-232 connection, which in turn flags the area to be cleared while stopping all system motion.

Figure 9:
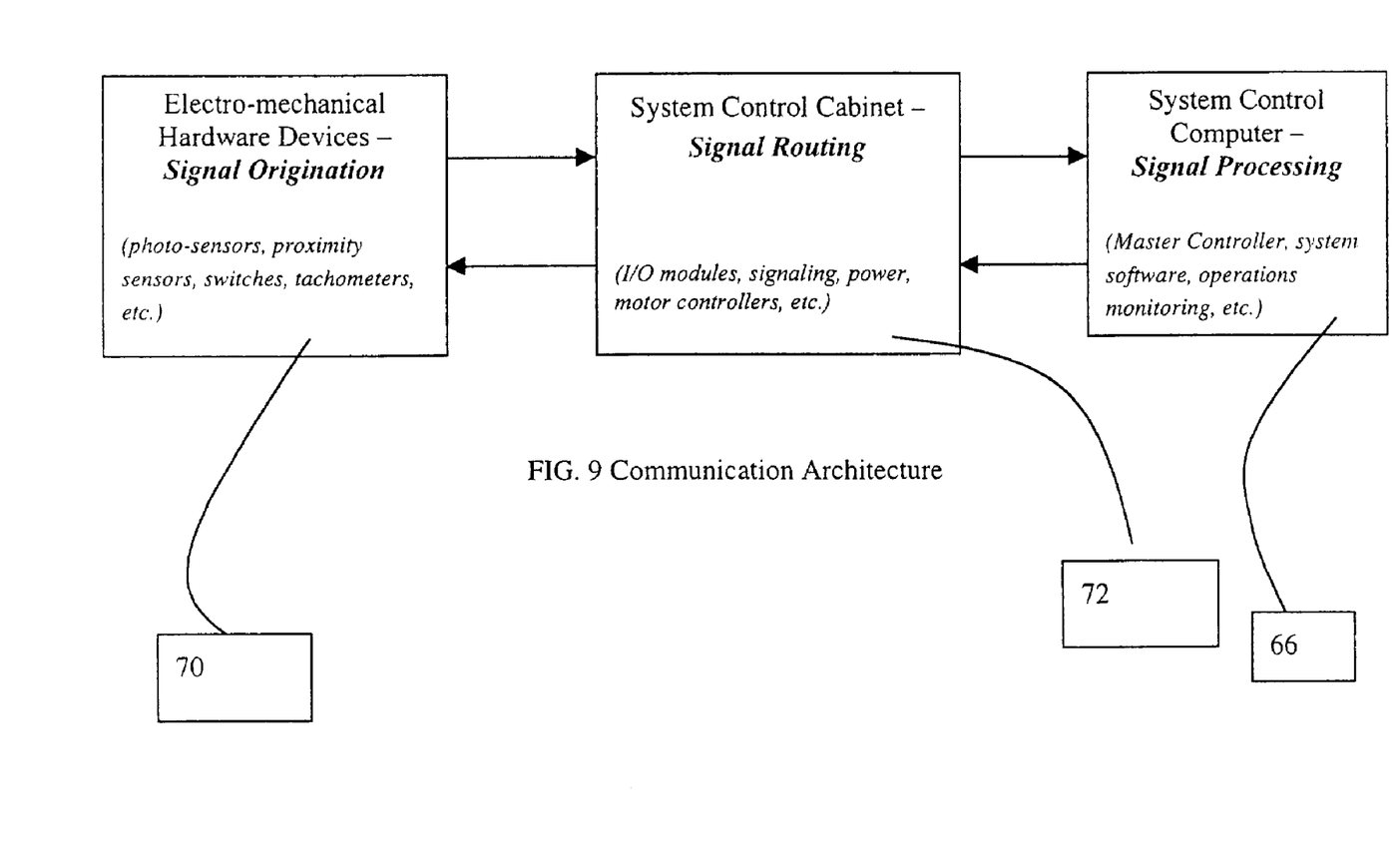
FIG. 9 is a flow diagram of the communication architecture.
Figure 10:
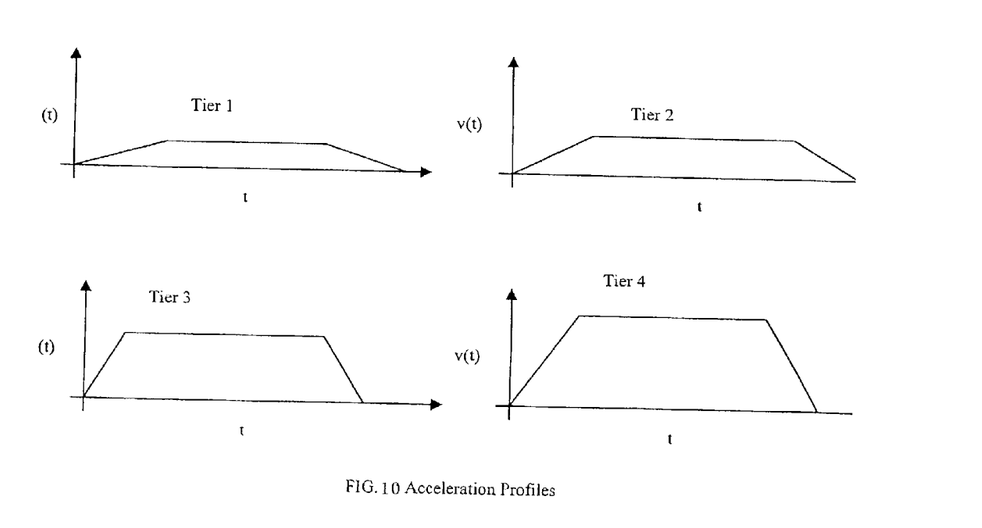
FIG. 10 are graphs showing the various acceleration and deceleration profiles.

The third jam protection is provided by software timers which are embedded into the system software control code in the system master controller 66 (see FIG. 9). After the system software invokes certain mechanical executables (block 70 in FIG. 9), internal timers are started while the software of the control 66 (block in FIG. 9) is waiting for hardware (block 70, FIG. 9) to perform its duties and send back an input signal indicating such action has occurred. The software is expecting a certain input to maintain correct continual operation status. If the software does not receive the correct input signal in the allotted time plus a delta (difference)(aka software timer), an error flag is raised to the master control system 66 and the system stops all motion. The control cabinet 72 (block 72, FIG. 9) provides physical networking connections between the control computer 66 and the electromechanical hardware 70. The control cabinet 72 features optical input/output boards that send and receive signals from hardware objects such as proximity sensors or photo sensors and process them for interpretation by the system computer where the system software is located.

The main purpose of the software timers is to help monitor article control and article jams in the conveyor line. After the system control software invokes certain mechanical executables, internal software timers are started while the software is waiting for hardware to perform its duties and send back an input signal indicating such action has occurred. Duties include diversion of articles and control of articles while in motion in a conveyor zone. The tasks that the software timers monitor are checking to "see" that articles are where they are supposed to be, when they are supposed to be, according to the sorting and control algorithm of the entire system. The software is expecting a certain input to maintain correct continual operational status. If the software does not receive the correct input signal in the allotted time plus a delta (difference) (aka software timer), an error flag is raised to the master control system 66 and the system stops all motion. The control cabinet 72 provides physical networking connections between the control computer and the electromechanical hardware. The control cabinet features optical input/output boards that send and receive signals from hardware objects such as proximity sensors or photo sensors and process them for interpretation by the system computer where the system software is located. (See FIG. 9).

Software timers are used in all areas where there is an input signal expected by the system software from a photoelectric or electromechanical sensor, when the bi-directional pusher is integrated into a zero pressure accumulation conveyor such as that used for sorting, transporting or accumulating articles.

Typical physical locations of various sensor types are:
Main conveyor, end of zone, photoelectric sensor 94 (FIG. 4).
Buffer conveyor, Zone 1 of 'X', photoelectric sensor 92 (FIG. 4).
Buffer conveyor, Zone 2 of 'X', photoelectric sensor 92 (FIG. 4).
Buffer conveyor, Zone n of 'X', photoelectric sensor 92 (FIG. 4)
Rotating pusher assembly, Home position, Proximity (Hall Effect) sensor 74 (FIG. 7).
Bi-directional Pusher motor/controller, overload circuit (combination of motor 52 and motor controller 68.

The following is a complete example of a typical software timer used in the present invention. The following is a timing diagram that is broken up into time steps to convey the thought and instantiation of a software timer. A specific example is of a tray of mail going from the main conveyor to the buffer conveyor.

TABLE

| Sequence Number | Action | Time (msec) | Description |
|---|---|---|---|
| 1 | Start | 0 | Start |
| 2 | System idle. | 1 | Tray is stopped on main conveyor, ready for diversion into the perpendicular buffer conveyor. |
| 3 | Divert (left or right) command. | 20 | System software recognizes tray must be diverted into the buffer according the sort plan manager. |
| 4 | Bi-directional pusher activated for 1 index. | 40 | The bi-directional pusher is activated. |
| 5 | Two internal software timers are started. | 41 | Timers counting the number of milli-seconds, waiting for the input signal from the:<br>1. "home" position sensor that the "index" was successful.<br>2. buffer input sensor that mail tray has cleared the opening and has not jammed<br>Internal timers simply run of the system clock that any computer has as part of its design. |
| 6 | Midpoint of index. | 441 | The tray is in process of being pushed from the main conveyor transport to the buffer conveyor. |
| 7 | Bi-directional pusher deactivated. | 442 | Buffer conveyor in-going (out-going) photo-sensor is broken by tray. |
| 8 | Bi-directional pusher motion stops. | 882 | Home position sensor sends signal indicating completion of index move. |
| 9 | Timer #1 stops. | 885 | Home sensor timer stops. |
| 10 | Look up table comparison. Y <= 1000 | Y = 950 | Timer = 950 which is less than max allowable 1000 msec. Successful index because it received the signal within the allotted time. |
| 11 | Timer #2 stops. | 953 | Buffer conveyor in-going (out-going) photo-sensor is unbroken. |
| 12 | Look up table comparison. Z <= 1400 | Z = 1200 | Timer = 1200 which is less than max allowable 1400. Successful index because it received the signal within the allotted time. |
| 13 | Next | 1250 | Next |

Note: If time span of index (Y or Z) was greater than 1000 or 1400 ms respectively, then the system software that poles the various devices and contains code that is triggered by the timing overrun, would flag the software, stop the system and flag the operator using the Graphical User Interface of the complete conveyor system that there is a jam present in the system.

These three devices working in concert provide an extremely reliable jam detection sub-system that covers all forms of jam faults.

When attempting to maneuver an article laterally, which is 90 degrees from the article's present longitudinal course, care should be taken with respect to the amount of force and hence acceleration (F=ma) that is used to move the at-rest article. The point of contact between the pusher fingers 36 and the article 40 is relatively lower than the article's center of gravity, depending on how much mail is contained in each mail tray (infinitely variable between 0 and 75 lbs).

This sub-system to the bidirectional pusher dynamically changes the acceleration profile of the diverter motor 52 based on article weight information gathered from a commercially available in-motion scale 96 (shown in dashed lines in FIG. 4 for clarity). The weight information is gathered upstream from a particular diverter location and is accurate to within +/−0.1 lbs. This information is sent, via an RS-232 communication line, for example, to the master controller 66. The DC motor controller 68 receives that information from the main control system 66 and adjusts (re-programs) the acceleration and deceleration profiles such that the article 40 accelerates slowly at the beginning of a cycle, has an acceleration plateau in the middle of the cycle and decelerates quickly at the end of the cycle in such a manner that the mail tub does not tip, flip, stay where it is or fly off the conveyor. The movement of the pusher fingers 36 is thus customized for the particular characteristics of the mail tray article 40. This control sequence makes the operation much more controllable and reliable thereby promoting a more robust conveyor system.

Figure 11:
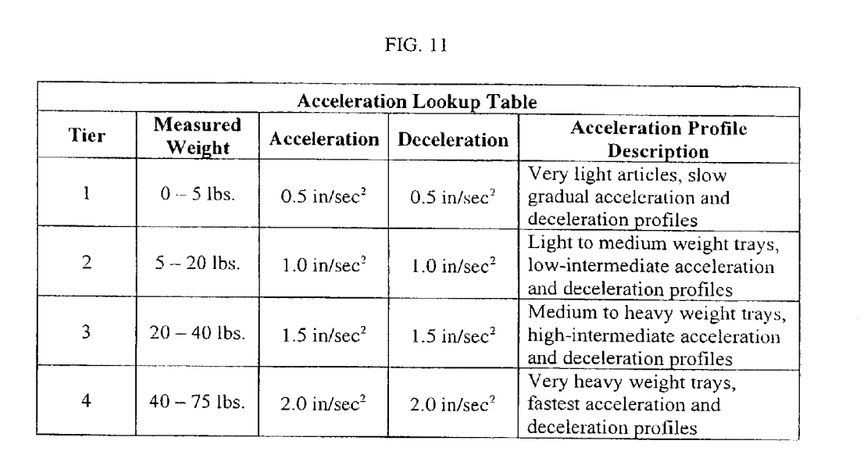
FIG. 11 is an acceleration look-up table.

See FIG. 11 which shows four different profiles, in this example, which operate in accordance with an Acceleration Lookup Table (see FIG. 11). Thus, when the articles are very light (0–5 pounds), they are in tier 1, which provides a slow gradual acceleration and deceleration profile, e.g., 0.5 in/sec$^2$.

When the articles are light to medium weight trays (5–20 pounds), they are in tier 2, which provides a low-intermediate acceleration and deceleration profile, e.g., 1.0 in/sec$^2$.

When the articles are medium to heavy weight trays (20–40 pounds), they are in tier 3, which provides a high-intermediate acceleration and deceleration profile, e.g., 1.5 in/sec$^2$.

When the articles are very heavy weight trays (40–75 pounds), they are in tier 4, which provides a the fastest acceleration and deceleration profile, e.g., 2.0 in/sec$^2$.

Depending upon the circumstances a lesser or greater number of tiers may be provided and may be used with even heavier articles.

In operation, an incoming tray 40 enters the diverter zone and is sensed by a suitable sensor 92. The push up stop 62 is actuated to the "up" position and the incoming tray 40 is stopped by the push up stop and another sensor confirms this.

The incoming sensor 92 senses the unblocked, blocked then unblocked again status to prove that the article did enter and clear the zone safely. The second sensor 98, located on the barrel of the air cylinder confirms that the cylinder fired correctly, thereby stopping the article from further movement (see FIG. 6).

There may be two sensors which confirm this. The first is that an incoming sensor senses the unblocked, blocked, then unblocked again status to prove the article entered and cleared the zone safely. The second sensor is on the barrel of the air cylinder 64 which confirms the cylinder fired correctly thereby stopping the article from further movement.

The master processor or controller 66 informs a programmable logic, which is a part thereof, as to which direction the tray is to be diverted, left or right. The motor 52 is activated in the correct direction for proper diversion of the tray 40. The tray is engaged by the four pushers 36 and accelerated off the conveyor into the correct buffer zone. The next pusher 36 in line after the diverter cycle activates the proximity sensor 74 and signals the motor 52 to stop instantaneously to be ready for the next tray. A sensor senses a correctly diverted tray. The push up stop 62 is deactivated and returned to its "down" position. Then the bidirectional pusher is ready for the next incoming tray.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. An article pusher for a conveying system, comprising:
   a. a conveyor including a multiplicity of spaced rollers for moving articles along a longitudinal path;
   b. a push up stop normally positioned below the conveyor and movable between adjacent rollers to a position above the rollers to stop forward movement of an article which is on the rollers; and
   c. lateral diverters for moving articles, which are on the rollers and stopped by the push up stop, to a position off of the rollers and out of the longitudinal path and at a right angle to the longitudinal path, said diverters being arranged to accelerate articles slowly, in a horizontal direction, for the first part of a diverting cycle until, during the first part of the cycle, the articles reach an acceleration plateau and then decelerate the articles quickly, in the horizontal direction, at the very end of the cycle to provide time for an article to exit the conveyor and be moved out of the longitudinal path.

2. A mail tray pusher for a conveying system, comprising:
   a. a conveyor including a multiplicity of spaced rollers for moving mail trays along a longitudinal path and including a bar code label reader and a control device;
   b. two lateral stations, one on each side of said conveyor for receiving mail trays delivered from said conveyor;
   c. a push up stop normally positioned below the conveyor and movable between adjacent rollers to a position above the rollers to stop forward movement of a mail tray which is on the rollers;
   d. a stop activator controller based upon information on a bar sort code label on said tray and which has been previously provided to the control device upstream of said push up stop; and
   e. lateral diverters for moving a mail tray, which is on the rollers and stopped by the push up stop, to a position off of the stop and out of the longitudinal path and at a right angle to the longitudinal path to one of said stations depending upon the information on the tray's bar sort code label which has been delivered to said control device, said control device determining which lateral station is to receive said tray.

3. A pusher as defined in claim 2 wherein elements b., c., d. and e. form a single complete diverter station.

4. A pusher as defined in claim 3 wherein there are a plurality of diverter stations.

5. A pusher as defined in claim 4 wherein there are four diverter stations.

6. A pusher as defined in claim 4 further comprising a controller for determining which article will be stopped at a particular diverter station and the direction it will be moved laterally.

7. In a conveying system for sorting mail trays having a bar code sort label thereon determinative of the delivery site of the trays, and including a roller conveyor having a longitudinal path and a multiplicity of spaced rollers for moving mail trays along a longitudinal path and at least two lateral stations, one on each side of the conveyor for receiving mail trays from the conveyor and to which at least some of the mail trays are delivered depending upon the information on the bar code sort labels which information is delivered to a master controller to determine the delivery site of each tray, the improvement comprising a bidirectional mail tray pusher which includes:
  a. a push up stop arranged below the conveyor and movable between adjacent rollers to a position above the rollers thereby to stop forward movement of such tray and activated by a master controller based upon information on a bar code sort label on a tray and which has been previously provided to said control upstream of said push up stop; and
  b. lateral diverters for moving a mail tray which is stopped by the push up stop to a position off of the stop and out of the longitudinal path and at a right angle to the longitudinal path to one of the lateral stations depending upon the information on the tray's bar sort code label which has been delivered to the master controller.

8. The improvement as defined in claim 7 wherein there are a plurality of mail tray pushers.

9. The improvement as defined in claim 1 wherein each diverter momentarily stops articles for diversion.

10. The improvement as defined in claim 1 wherein the diverters provide positive pusher engagement that contacts the articles from the side and accelerates them out of the longitudinal path.

11. The improvement as defined in claim 7 wherein each diverter has a variable speed motor drive to accommodate different weight articles.

12. The improvement as defined in claim 11 wherein a motor controller governs the motor drive's velocity profile to provide acceleration and deceleration to the diverter.

13. The improvement as defined in claim 12 wherein each motor controller controls each drive to move a diverter to accelerate the mail trays slowly horizontally for the first part of a diverting cycle until during the first part of the cycle the mail trays reach an acceleration plateau and subsequently decelerate the mail trays quickly horizontally at the very end of the cycle to provide time for a tray to exit the conveyor and go out of the longitudinal path.

14. The improvement defined in claim 13 wherein the diverters include mail tray moving means having "n" equally spaced pushers thereon and moving 1/n of a revolution of the mail tray moving means during each pusher cycle.

15. The improvement defined in claim 13 wherein each motor controller controls each drive to a velocity profile depending upon the weight of the mail tray being moved.

16. The improvement defined in claim 15 wherein there is a scale upsteam of the diverters for determining the weight of each mail tray on said conveyor.

17. The improvement defined in claim 16 wherein there are multiple jam detection devices to control the stopping of each motor drive.

18. The improvement defined in claim 17 wherein a first jam detection device is a sensor for sensing the presence of the diverters in their home position.

19. The improvement defined in claim 18 wherein a second jam detection device is a current overload sensor.

20. The improvement defined in claim 19 wherein a third jam detection device is a series of software timers.

* * * * *